Figure 5:
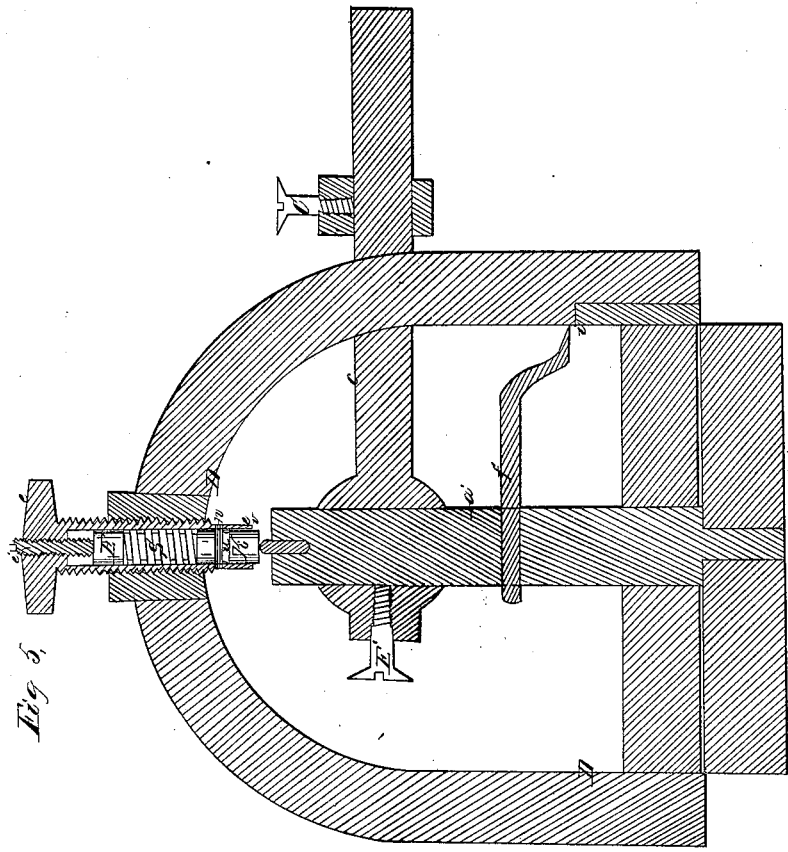

J. & A. Judson,
Governor Valve,
N° 7,755.  Patented Nov. 5, 1850.
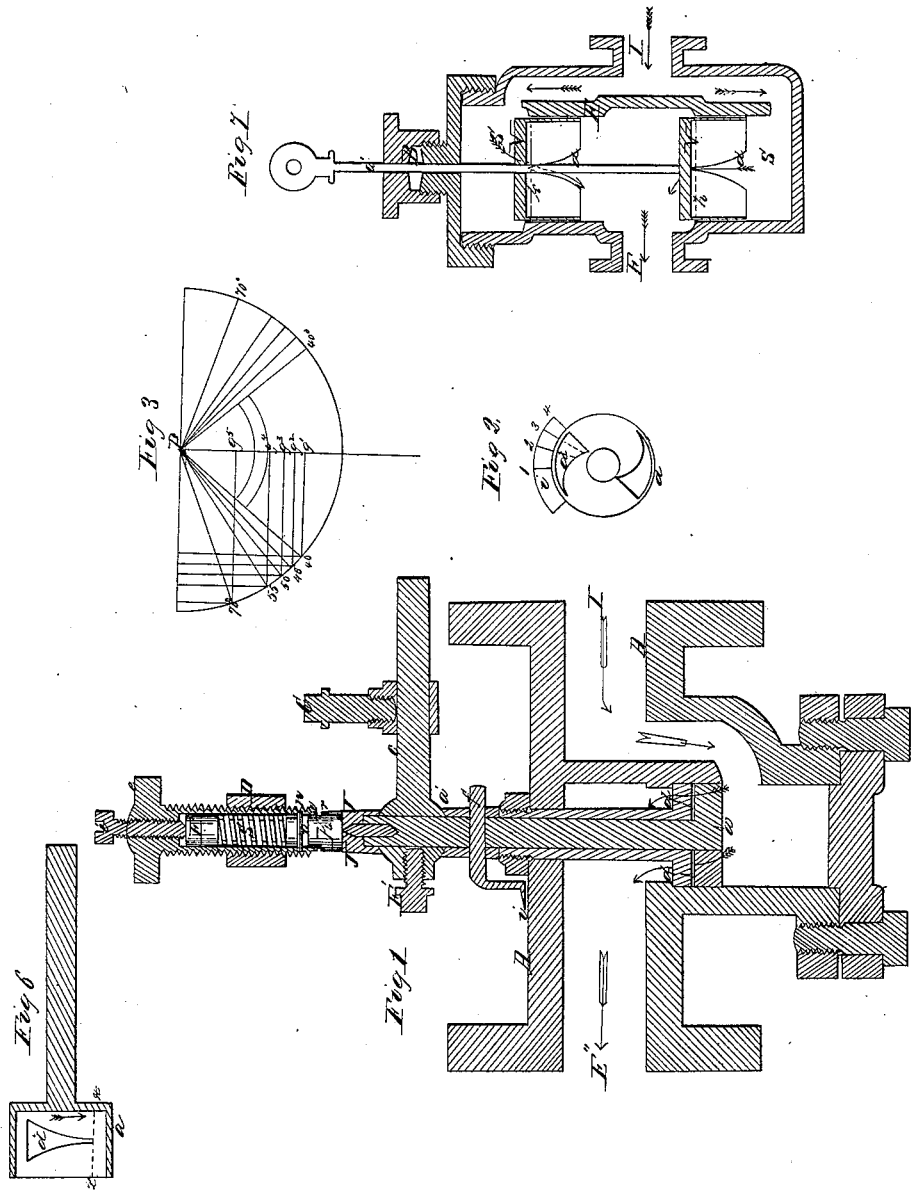

J. & A. Judson,

Governor Valve.

№ 7,755.

Patented Nov. 5, 1850.

UNITED STATES PATENT OFFICE.

JUNIUS JUDSON AND ALFRED JUDSON, OF ROCHESTER, NEW YORK, ASSIGNORS TO JUNIUS JUDSON.

VALVE FOR GOVERNORS.

Specification forming part of Letters Patent No. 7,755, dated November 5, 1850; Reissued January 10, 1854, No. 255.

*To all whom it may concern:*

Be it known that we, JUNIUS JUDSON and ALFRED JUDSON, of Rochester, in the county of Monroe and State of New York, have invented, a new and Improved Governor-Valve for Steam-Engines; and we do hereby declare the following to be a full, clear, and exact description thereof, reference being had to the accompanying drawings which make a part of this specification.

The purposes of our invention are to reduce the variations in the speed of an engine when subjected to the variations of load to which it is liable, and to keep the rate of speed at all times within safe limits, without the necessity of employing the engineer, to open and close a stop valve, when machinery is thrown on and off; and, as subsidiary to these purposes, to diminish the friction and other resistances to which the old fashioned valve is subjected.

It is also an object with us to obviate those troublesome accelerations and retardations of speed in an engine which take place even when running under the same load.

For want of some means of governing the speed of engines beyond what is afforded by the governor valves and machinery in common use for that purpose, it not infrequently happens that the engine either relieved from a part of its load or charged suddenly with an additional resistance will have its velocity of revolution varied from the normal, or required rate, from ten to thirty per cent or more,—subjecting the work to damage, and the machinery to derangement or destruction. Our valves keep this variation as low as from two to eight per cent, dependent in some measure, upon the more or less perfect manner, in which the engine is constructed, but never admitting the speed to vary so far from the established rate as to interfere with useful working or to result in damage to the engine or other machinery driven.

The points to which we have directed particular attention are: 1. The form of the opening through which the steam passes. 2. The freedom with which the governor valve moves, and the means of effecting it. 3. The range of the movements allowed to the governing balls of the revolving pendulum or governor, when acting to close openings of variable breadth. 4. The means of regulating or adjusting the total range which the valve may take over the openings between the extreme position allowed to the governing balls according as the whole or a part only of the power of the engine is to be brought into use, or as a high or a low pressure of steam is to be maintained in the boiler.

We form the valve openings in such a manner that they present a narrow passage for the steam at high speeds, and grow broader toward that end to which the valve retires when the speed is diminished, so that the area of the steam passage is increased not only by the greater length of opening uncovered but by the increasing breadth toward the full open end. In general the breadth increases more rapidly than the length, that is more rapidly than the valve retires from, or uncovers the opening longitudinally. Whether a low speed be caused by a great resistance, or by a low pressure of steam a rapid enlargement or diminution of the steam-way is necessary in order to correct promptly the variations in such low rate of speed, and whether a high speed be occasioned by a slight resistance or by a high tension of steam, a slow rate of enlargement or diminution of the steam way will suffice to correct inequalities in such high speed.

Figure 4:
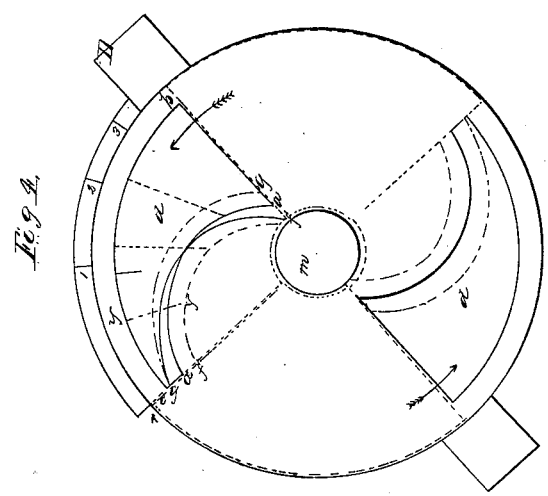

The form of opening which we find most advantageous is that delineated in Fig. 4, where the valve represented by the quadrantal spaces inclosed in long dots, close over the apertures $d$, $d$, in the direction of the arrows, and in opening move in the reverse direction in the way indicated by the numerals 1, 2, 3, placed on the indicator arc.

In cases where a certain proportion of the machinery is never detached, the narrower or angular end of the opening may be closed or filled up to the extent indicated by the dotted line y, y, Fig. 4, without very serious detriment to the action of the valve. But this change we do not recommend. We find that in larger engines, the narrower end of the openings need not be drawn so near to a point as in small ones.

When long lines of shafting or other machinery involving much constant friction is attached to the engine, the plane line a, a, may be replaced by a line giving a large opening which may vary as far from a, a, as the dotted line f f'; and in case of extraordinary lightness and ease of running, the line a, a, may on the other hand vary so as to narrow the opening to the limit of the dotted line g g', and with the extreme of ease, the line may vary or run from f' to g. Though we prefer the disk form for the valve-seat, yet we shall sometimes construct our valves as seen at d Fig. 6 or Fig. 7, so that their seats and openings shall be in the curved sides of a cylinder or cone, but the principle on which the open spaces are formed will still be the same, and the same law of opening will be observed when the valves are made to slide instead of revolving.

In Fig. 6, the cylinder a turns in the direction of the arrow to open the aperture d from the narrower to the wider end over the edge x x of the outer cylinder. Besides the irregular and dangerous action of the engine arising from the too rapid opening of the governor-valve at one time, and too slow an opening at another, there is, with the valves in common use, another source of disturbance or of sluggishness in action, requiring to be corrected; and demanding for the prevention of vibration, a combination of the form of opening with adequate means to render the correction prompt, so as to make the movements of the valve, over its openings, coincide in time with the demands of the work. The resistances created by the friction of a valve upon its seat, or bearing, and on the packings which prevents leakage of steam, and by its adhesion to the sides of the tube or box within which it is made to work, requires ordinarily a considerable force to overcome them. They will require a decided increase of speed in the governor balls before their expansion force will begin to open them, and an equal diminution of speed to allow them to descend when resisted by the causes just pointed out. These causes render all engines which rely on governor valves imperfect, liable to "jumping" or sudden and violent vibrations, when the quantity of machinery to be driven is suddenly varied and the best form of valve-opening will not wholly relieve that part of the vibration, which results from these impediments.

The manner in which we prefer to diminish the friction of the valve on its seat, is seen in Figs. 1 and 5, where e' is a set screw to operate against the spindle of the valve in order to provide against a contact of surfaces, (which would produce friction under a pressure of steam), and to insure its free action whether more or less closed.

We make the shaft of the screw e hollow, place within it the follower E, acting on a spring S, which, in turn, acts on the piston K, this piston has a short slot u, through which passes the pin n, allowing a very limited movement of the piston. When pressed fully out by the spring the piston projects a short distance r', beyond the end of the screw. The adjusting screw e' forces forward the follower E, compresses the spring S (Figs. 1 and 5) to such a degree of tension as will enable it barely to yield to the pressure of steam, and bring the valve nearly in contact with its seat when it covers the whole opening, (the steam being at its greatest pressure), but which will raise it slightly away from its seat as the valve opens, and when the effective pressure tending to keep it to its seat is no longer felt. As the effective pressure diminishes, the valve will recede from its seat giving a greater flow of steam through the openings, in exact proportion as the pressure decreases in the boiler, or as it is relieved from pressure by opening, when more machinery or resistance occasions lowering of speed in the engine.

In order to make the range of motion of the governor balls most advantageous for the prompt and efficient opening and closing of the valve, we confine their movements to the higher parts of the arcs, through which they are capable of rising. It being well known, that the time in which a conical pendulum will revolve, is determined by the vertical distance of the balls below their point of suspension, we so calculate the length of the suspending rods, as to make the balls rise, with the speed which they will have when the engine runs at the working rate, about forty degrees, from their perpendicular position; and we allow them when running with the greatest speed, to rise as high as 70 or 75 degrees, we find that as the centrifugal force of the balls when they expand 45 degrees is equal to their gravitating force. The higher range at which the balls revolve will give them a steadier motion or action on the valve, than the lower; and we also find it most advantageous to let the whole governing power of the balls be confined to a range of 15 or 20 degrees say between fifty and seventy degrees of elevation. So that when at the former height, the valve shall be at its limit of widest opening, and at the latter shall be at a nearly full closure.

We so arrange the length of the rods of our governor and the relation of the arms of the governing lever that an acceleration of about four per cent. above the prescribed speed of the engine shall nearly close the governor valve, and a falling off to the same extent below the prescribed speed shall leave the valve wide open. The manner of effecting this adjustment is to slide the wrist C on the valve lever c Figs. 1 and 5, to such a distance from the valve-stem, as will make the prescribed range of motion of the balls move the valve over the whole range of the valve opening required at the time.

To determine the range which the valve shall take over the opening, the valve lever c Figs. 1 and 5, is furnished with a set screw E whereby its position on the valve stem may be changed. So that when the governor balls are perfectly at rest, the valve opening shall be either wholly uncovered or but partially so, according as the whole power of the engine or only a certain part of it is to be brought into operation.

For the purpose of adjusting the lever c so as to give the valve the required set according to the quantity of work which the engine is intended to perform, the valve stem is furnished with an indicator $f$, which shows the amount of opening at every position whether the valve-lever be set in one position or another, on the stem. This indicator in combination with the adjustable valve-lever is likewise useful in regulating the amount of opening of the valve according to the pressure of steam which it is intended to maintain in the boiler, while the amount of work is constant. It is convenient, but not indispensible that the number of valve openings in the same disk as seen in Fig. 4, should be confined to two. The same amount of space with a like disposition in regard to the openings of the valve (with increasing rapidity the wider it opens,) may be preserved, into whatever number of parts the open space is distributed.

It will be observed that the arcs $f$ $f'$ $a$ $a$ and $g$ $g'$ are not portions of perfect circles; but that the curvature has a shorter radius near the center $m$ of the valve seat, or face, than near the periphery $p$. If the opening be divided into three or more parts, the rapidity of increase in the rate of opening may be made greater than when the whole of the space is distributed in two openings only, but an opening in which the length should be materially less, in proportion to the width than is seen in Fig. 4, would be objectionable, on account of the greater variation which would be occasioned by looseness in the joints of the levers and connecting rods or which might result from a jar or shake of the engine.

In Fig. 6, is given a modification of valve in which the opening $d$ is formed in a curved surface, and to avoid the friction which would be produced on its seat, two opposite openings may be made in the sides of the cup-shaped valve $a$.

In Fig. 7 two valves V, V, placed on a common valve rod $a'$ are made to slide in a cylinder or box F, the steam enters through I divides into two currents and passes into the steam ways S, S, whence it escapes whenever the valve is drawn into such a position that an opening is made between the edge $h$ of the cylinder or box containing the valve and the top of the valve itself, into the steam passage $d$. It then passes along the opening E into the cylinder of the engine. In this case the openings may be in a cup shaped valve, and to avoid friction may be formed in opposite curved sides. The effect is to counteract or compensate for the friction which would be produced if the valve were not counterpoised.

In Fig. 3, we have indicated by the position of the governor arms F, 40°,—F, 70° and $c$., the range generally found to act most advantageously on a frictionless valve, having openings of the character of those herein described. The lines P, $g'$, and 40°, $g'$, indicate respectively the gravitating force, and the centrifugal force when the balls are at the lowest limit of their range. And the lines P, $g^5$, and $g^5$, 70°, show the relation of the same forces to each other when the balls are at their highest range. In Fig. 2, is given the cord of our indicator $f$, (Fig. 1,) so divided as to denote the proportional part of the space opened by the valve. It is not an index of the mere movement of the valve, nor is it solely or principally designed to mark that movement, but to mark the opening and enable the engineer to adjust the amount of opening for his several purposes as above set forth, and without requiring him to take cup from the valve box.

What we claim as our invention and desire to secure by Letters Patent is—

1. Making the valve openings of governor valves to widen from the closed toward the fully open end, and also in such a manner that when the governor acts upon the valve under low speed, it shall cause the opening or closing of that part of the steam passage where the rate of widening or narrowing of the passage, is more rapid than at the part on which the valve acts at high speeds.

2. We also claim forming valve openings substantially as described in Fig. 4, whatever may be the number of openings into which the space or valve seat is divided and whether the saw openings are made in plane or curved surfaces.

3. We also claim the spring set-screw reacting against the pressure of steam on the valve, not only for relieving the valve from friction but also for causing it to recede slightly from its seat when the valve approaches its open position, whereby an increased flow of steam is permitted, and the rate of flow augmented the more the valve opens, or the tension of steam diminishes as herein set forth.

4. We also claim in combination with a valve lever adjustable to the stem of the valve, an indicator not adjustable for the purpose of setting the valve in any required position, without opening the valve box.

ALFRED JUDSON.
JUNIUS JUDSON.

Witnesses for Alfred Judson:
  CHARLES R. BABBITT,
  CHARLES GILBERT.

Witnesses for Junius Judson:
  WALTER R. JOHNSON,
  WALTER R. JOHNSON, Jr.

[FIRST PRINTED 1913.]